United States Patent [19]

Emura et al.

[11] Patent Number: 4,824,046
[45] Date of Patent: Apr. 25, 1989

[54] CLUTCH MECHANISM FOR USE IN FISHING REELS

[75] Inventors: Masaharu Emura; Takehiro Kobayashi, both of Fuchu, Japan

[73] Assignee: Ryobi Limited, Hiroshima, Japan

[21] Appl. No.: 98,748

[22] Filed: Sep. 16, 1987

Related U.S. Application Data

[63] Continuation of Ser. No. 858,948, May 2, 1986, abandoned.

[30] Foreign Application Priority Data

May 7, 1985 [JP] Japan .................. 60-67572[U]

[51] Int. Cl.$^4$ ............................................. A01K 89/02
[52] U.S. Cl. .................................. 242/220; 242/218
[58] Field of Search ................. 242/84.1 R, 216, 217, 242/218, 219, 220, 221; 192/67 R

[56] References Cited

U.S. PATENT DOCUMENTS

| | | | |
|---|---|---|---|
| 4,014,422 | 3/1977 | Morishita | 242/212 |
| 4,341,366 | 7/1982 | Kawada | 242/220 |
| 4,406,427 | 9/1983 | Murakami | 242/220 |
| 4,564,158 | 1/1986 | Moosberg | 242/220 |
| 4,570,878 | 2/1986 | Nakajima | 242/220 |
| 4,593,869 | 6/1986 | Yasui | 242/220 |

FOREIGN PATENT DOCUMENTS 60-78526  5/1985  Japan .

Primary Examiner—Stuart S. Levy
Assistant Examiner—Katherine Matecki
Attorney, Agent, or Firm—Frishauf, Holtz, Goodman & Woodward

[57] ABSTRACT

In a clutch mechanism for use in a fishing reel, one end of a torsion spring is connected to a flipping cam which is rotated between a pair of pins. When the flipping cam positions at one of the pins, the torsion spring biases the clutch mechanism selectively to its ON and OFF states depending upon the state of the clutch mechanism. On the other hand, when the flipping cam positions at the other one of the pins, the torsion spring continuously biases the clutch mechanism to its ON state irrespective of the state of the clutch mechanism. Thus, in the latter condition, the clutch mechanism is shifted and held at its OFF state only during when a force exceeding the biasing force of the torsion spring continues to be applied to the clutch mechanism, and immediately when the force is removed, the clutch mechanism automatically returns to its ON state by the biasing force of the torsion spring.

11 Claims, 5 Drawing Sheets

CLUTCH MECHANISM FOR USE IN FISHING REELS

This application is a continuation of application Ser. No. 858,948, filed May 2, 1986, now abandoned.

BACKGROUND OF THE INVENTION

This invention relates to a clutch mechanism for use in a fishing reel, and more particularly a clutch mechanism capable of transmitting and interrupting torque between a line winding spool and a handle for rotating the spool and capable of being automatically switched from a torque interrupting state to a torque transmitting state when the handle is rotated in the forward direction, that is in a direction for taking up the line.

The prior art clutch mechanism, as disclosed in U.S. Pat. No. 4,014,422 or U.S. Pat. No. 4,406,427, was constituted by a main gear rotated by a handle, a pinion meshing with the main gear and rotatably and axially slidably-fitted on a spool shaft so that when the pinion engages a notch of the spool shaft the pinion can rotate together with the spool shaft, a clutch bar for axially sliding the pinion, and a clutch cam connected to an operating lever and disposed between the clutch lever and a supporting plate. Further, the clutch mechanism is shifted to its OFF state where the coupling between the pinion and the spool shaft is released, by manually depressing a push lever and a torsion spring holds and maintains the clutch mechanism at its OFF state. On the other hand, the clutch mechanism is shifted to its ON state from its OFF state by forwardly rotating the handle. The torsion spring is used to hold and maintain the clutch mechanism selectively in its ON and OFF states.

With the above mechanism, however, it becomes necessary to repeatedly depress the push lever, take out the fishing line and rotate the handle so as to adjust the length of the fishing line to be taken out. Thus, the adjusting operation is fairly troublesome and it becomes difficult to desirably and minutely adjust it.

According to this aspect, an improved clutch mechanism has been proposed in Japanese patent provisional publication No. Sho 60-78526 published and laid open for public inspection on May 4, 1985.

In this mechanism, one end of the torsion spring is secured to the inner end of a flipping lever and the position of the one end of the torsion spring is shifted between its normal and flipping positions by manually operating the flipping lever from outside the reel body. When the one end of the torsion spring is positioned at its normal state, the torsion spring biases the clutch mechanism selectively to its ON and OFF state, just as in the above described prior mechanism. On the other hand, when the one end of the torsion spring is shifted to its flipping position, the torsion spring continues to bias the clutch mechanism only to its ON state even when the clutch mechanism is in its OFF state. Accordingly, in the latter condition, the clutch mechanism is shifted to its OFF state only while the push lever continues to be manually depressed, and the clutch mechanism automatically returns to its ON state immediately when the depressing force applied to the push lever is released.

With this mechanism, however, because a holder having two inlets for selectively receiving a boss formed on the inner part of the flipping lever is utilized to hold the flipping lever to its normal or flipping positions, three steps are required to shift the torsion spring between its normal and flipping states. Those are, (1) pushing the flipping lever to release the engagement between the boss and the holder, (2) swinging the flipper lever to face the boss to another inlet of the holder while continuing the pushing, and (3) releasing the pushing force applied to the push lever to insert the boss into another inlet of the holder. Thus, the operation for shifting the torsion spring between its normal and flipping states can not be accomplished by one step. Further, the constructions of the flipping lever and the holder are complicated so that the fabrication and assembling therefor are not easy.

SUMMARY OF THE INVENTION

Accordingly, it is an object of this invention to provide an improved clutch mechanism capable of shifting a torsion spring by one step between its normal and flipping states with simply constructed shifting members.

To accomplish this and other objects, this invention provides a clutch mechanism which comprises a pinion operated by a clutch cam and a clutch bar, a handle connected to and disconnected from a spool shaft by engaging and disengaging the pinion from a notch of a spool shaft, a push lever for shifting said clutch mechanism between its ON and OFF states, and a torsion spring provided for selectively urging said clutch mechanism to its ON and OFF states; the improvement which comprises a flipping cam for shifting said torsion spring to its flipping state where said torsion spring continues to urge said clutch mechanism to its ON state while said clutch mechanism is in its OFF state, said flipping cam being rotatably mounted between a base plate and a cover plate of a reel body; a flipping lever connected to said flipping cam; and a pair of stopper members for regulating the swinging angle of said flipping cam between its normal and flipping positions.

DESCRIPTION OF THE PREFERRED EMBODIMENTS

Figure 1:
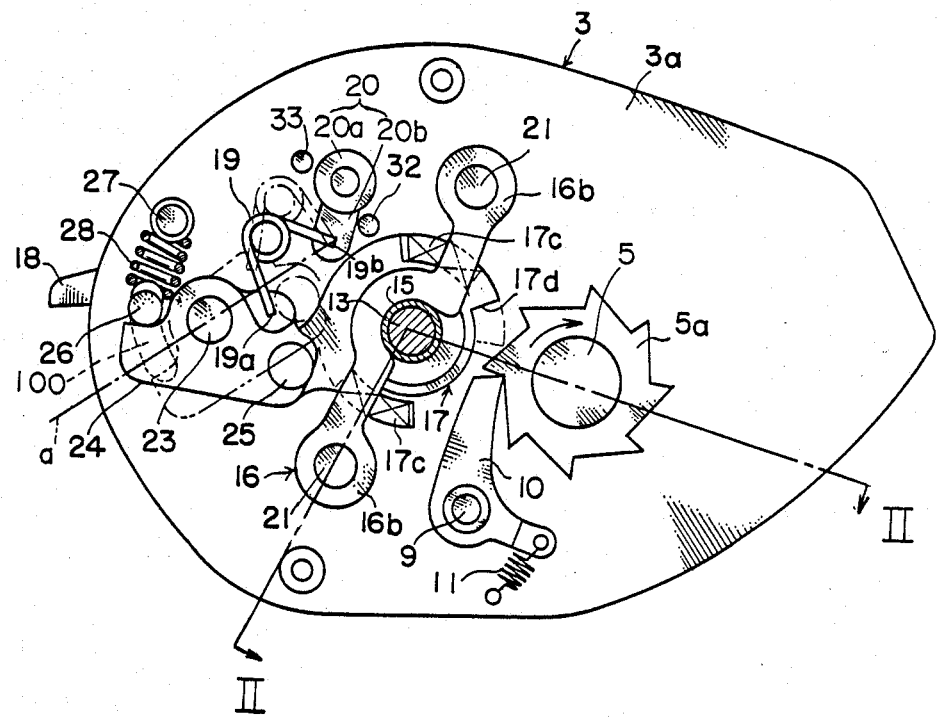
FIG. 1 is a front view of one embodiment of the clutch mechanism for use in a fishing reel according to this invention wherein a torsion spring is positioned at its normal state.
Figure 2:
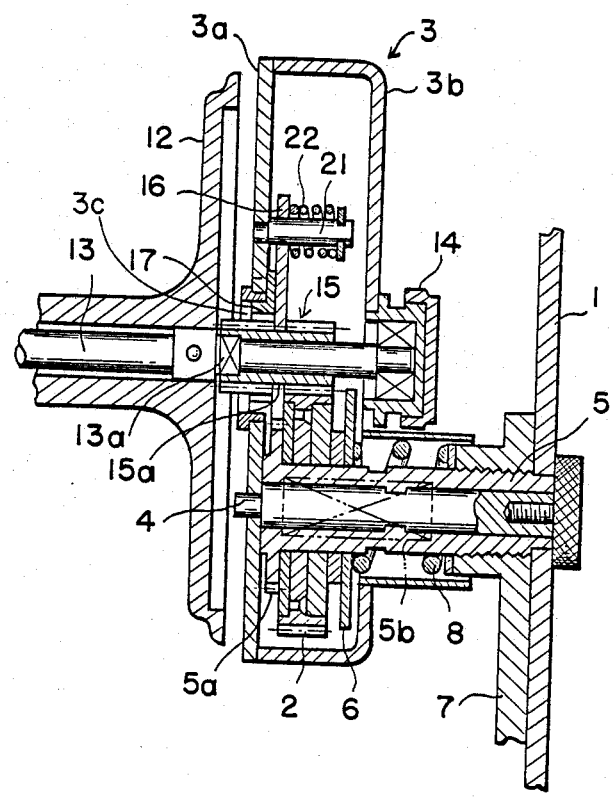
FIG. 2 is a sectional view of the clutch mechanism taken along a line II—II in FIG. 1.

In one embodiment, as shown in FIGS. 1 and 2, the clutch mechanism comprises a ratchet wheel 5a mounted on a handle shaft 5 supported by a base plate 3a of a reel body 3 through a shaft 4, a drag star handle 7 threaded to the handle shaft 5, a main gear 2 disposed between the ratchet wheel 5a and the drag star handle 7 via a drag washer 6 and a drag spring 8, and a pinion 15 meshing with the main gear 2 and mounted on a spool shaft 13 to be slidable in the axial direction. The pinion 15 is coupled with or released from a notch 13a provided for the spool shaft 13 to connect or disconnect the spool shaft 13 to and from a handle 1.

Furthermore, a clutch bar 16 is engaged with a groove 15a formed on the outer periphery of the pinion 15. Arms 16b, 16b symmetrically projecting from the clutch bar 16 are mounted on guide pins 21,21 secured to the base plate 3a to be slidable in the axial direction. Each arm 16b is resiliently urged toward the base plate 3a by a coil spring 22 surrounding the guide pin 21. A clutch cam 17 is interposed between the base plate 3a and the clutch bar 16. the central cylindrical portion of the clutch cam 17 is fit in an opening 3C of the base plate 3a while permitting the free rotation of the clutch cam 17.

A push lever shaft 26 pulled by a tension spring 28 is slidably fit in a slot 100 formed on the base plate 3a. One end of the spring 28 is secured to a boss 27 planted on the base plate 3a. An operating lever 24 is rotatably mounted on the base plate 3a by a stepped screw 23 and is urged to selectively swing in opposed directions by a torsion spring 19, one end 19a of which is mounted to the lever 24. One end of the lever 24 and the clutch cam 17 are interconnected by a pin 25. When the lever 24 is rotated in the counter-clockwise direction in FIG. 1 beyond the dead point of the spring 19 by manually operating the push lever 18, the lever 24 and the clutch cam 17 would be automatically rotated by the resilient force of the spring 19 to the position indicated by a double-dotted line in FIG. 1 and held at that position.

Figure 5A:
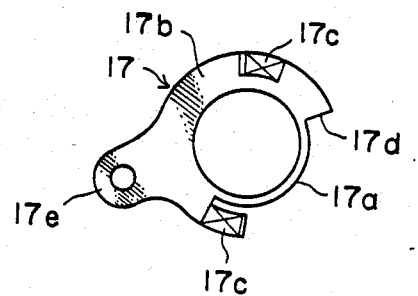
FIG. 5A shows a clutch cam and FIG. 5B a cam member thereof.
Figure 5B:
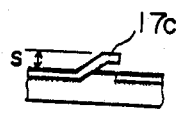

As shown in FIGS. 5A and 5B, cam members 17c, 17c each having a substantially larger displacement S than the coupling distance between the pinion 15 and the notch 13a of the spool shaft 13 are provided to the annular portion 17b of the clutch cam 17. When the clutch cam 17 is rotated in the clockwise direction in FIG. 1, the cam members 17c, 17c come to engage the clutch bar 16 so that the cam members 17c, 17c enter beneath the arms 16b, 16b by utilizing the inclined surfaces thereof, whereby the clutch bar 16 is moved rightwardly in FIG. 2 by displacement S together with the pinion 15 against the force of the springs 22,22 thus disengaging the pinion 15 from the notch 13a of the spool shaft 13. Accordingly, the spool shaft 13 is disconnected from the handle 1 and the clutch mechanism is shifted to its OFF state. The pawl 17d of the clutch cam 17 is positioned so that its locus intersects that of the ratchet 5a, and is engaged with the ratchet 5a when the clutch cam 17 is rotated in the clockwise direction in FIG. 1.

Engaged with the ratchet 5a is a pawl 10 for preventing the reverse rotation of the ratchet 5a. The pawl 10 is mounted on a boss 9 secured to the base plate 3a, and one end thereof is connected to a spring 11 secured to the base plate 3a.

Figure 4:
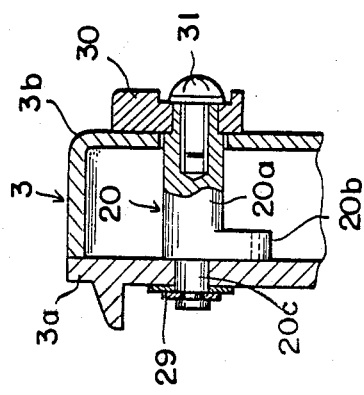
FIG. 4 is a partly sectional view showing a flipping cam.

A flipping cam 20 is rotatably pivoted between the base plate 3a and a cover 3b of the reel body 3, as illustrated in FIG. 4, and dislocation thereof is preventing by an E-shaped ring 29. A flipping lever 30 is secured to outwardly protruded end of the cam 20 by a screw 31. The cam 20 is provided with a protrusion 20b at base side of a shaft portion 20a, on which the other end 19b of the torsion spring 19 is mounted, and a pivot portion 20c is provided at the base end of the shaft portion 20a which pivotally passes through the base plate 3a of the reel body 3 and engages the E-shaped ring 29.

A pair of stopper pins 32, 33 are planted on the base plate 3a at a predetermined interval so as to limit the swinging area of the flipping cam 20 therebetween.

The stopper pin 32 is located at the position where, when the flipping cam 20 is shifted to contact the pin 32 as illustrated in FIG. 1, the torsion spring 19 functions in its normal way. That is, when the lever 24 is at its clutch ON state as illustrated in FIG. 1 by solid line, the torsion spring 19 urges the lever 24 to rotate in the clockwise direction. On the contrary, when the lever 24 is shifted to its clutch OFF state as illustrated in FIG. 1 by double-dotted line, the one end 19a of the torsion spring 19 is shifted to the position illustrated by double-dotted line across the dead point line a, and urges the lever 24 to rotate in the clockwise direction. During the above normal operations, the one end 19b of the torsion spring 19 is positioned in the area where it continues to urge the protrusion 20b of the flipping cam 20 to rotate in the counter-clockwise direction, i.e., toward the stopper pin 32, about the pivot portion 20c thereof irrespective of the positions of the torsion spring 19, thus, the flipping cam 20 is held at its normal positions.

Figure 3:
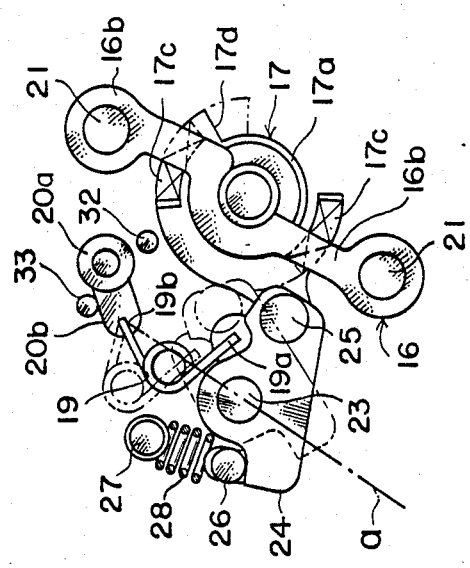
FIG. 3 is a front view showing principal elements of the clutch mechanism shown in FIG. 1 wherein a torsion spring is positioned at its flipping state.

The stopper pin 33 is located at the position where, when the flipping cam 20 is shifted to contact the pin 33 as illustrated in FIG. 3, the torsion spring 19 functions in its flipping way. That is, despite whether the lever 24 is at its clutch ON or clutch OFF, the torsion spring 19 continues to urge the lever 24 to rotate in the clockwise direction in FIG. 3. In other words, even if the lever 24 is shifted to its clutch OFF state as illustrated by double-dotted line, the one end 19a of the torsion spring 19 does not cross the dead point line a. During the above flipping operations, the one end 19b of the torsion spring 19 is positioned in the area where it continues to urge the flipping cam 20 to rotate in the clockwise direction, i.e., toward the stopper pin 33, about the pivot portion 20c thereof irrespective of the position of the torsion spring 19. Thus, the flipping cam 20 is held at its flipping position.

Thus, when the flipping cam 20 is at the position illustrated in FIG. 1 where it contacts the stopper pin 32, the torsion spring 19 urges the lever 24 selectively to its clutch ON state or clutch OFF state depending upon the position of the lever 24. However, when the flipping cam 20 is at the position illustrated in FIG. 3 where it contacts the stopper pin 33, the torsion spring 19 continues to urge the lever 24 toward its clutch ON state regardless of the position of the lever 24.

The above constructed mechanism operates as follows.

In the state shown by solid lines in FIG. 1, the mechanism is in the clutch ON state and the torsion spring 19 is in its normal state. When the clutch cam 17 is rotated in the clockwise direction by manually depressing the push lever 18, the pinion 15 is disengaged from the spool shaft 13 as the clutch bar 16 moves in the axial direction by cam members 17c, 17c to bring the clutch mechanism to the OFF state illustrated by double-dotted lines in FIG. 1. At this time, the pawl 17d of the clutch cam 17 is positioned between the adjacent teeth of the ratchet wheel 5a.

To shift the clutch mechanism from its OFF state to ON state, the ratchet wheel 5a is to be forwardly rotated by the handle 1. With this rotation of the ratchet wheel 5a, the pawl 17d is pushed by a tooth of the ratchet wheel 5a to be rotated in the counter-clockwise direction in FIG. 1. When the clutch cam 17 is rotated to a point beyond the dead point of the spring 19, the lever 24 is urged to automatically rotate in the clockwise direction against the force of the spring 28. As a consequence, the pawl 17d is out of the locus of the ratchet wheel 5a and the cam members 17c, 17c of the clutch cam 17 disengage from arms 16b, 16b of the clutch bar 16 so that the springs 22 causes the clutch bar 16 to return to the position shown shown in FIG. 2 together with the pinion 15. Thus, the pinion 15 and the spool shaft 13 are again coupled and thereby brining the clutch to its ON state.

On the other hand, when the flipping cam 20 is shifted by manually rotating the flipping lever 30 to its flipping state, the other end 19b of the torsion spring 19 is also rotated so that the dead point line a is shifted, as illustrated in FIG. 3.

In the state shown by solid lines in FIG. 3 where the clutch mechanism is in its ON state, the one end 19a of the torsion spring 19 is positioned at the right side of the dead point line a and urges the clutch cam 17 to rotate in the counter-clockwise direction so as to hold and maintain the clutch mechanism at its ON state. Under this state, by manually depressing the push lever 18, the lever 24 is rotated in the counter-clockwise direction and the clutch mechanism is shifted to its OFF state illustrated in double-dotted lines in FIG. 3. During this operation, the one end 19a of the torsion spring 19 is shifted from the solid line position to the dotted line position, but it is still positioned in the right side of the dead point line a and does not cross the line a, so that the torsion spring 19 still continues to urge the lever 24 to rotate toward its clutch ON state.

Accordingly, by removing the depressing force applied against the push lever 18, the lever 24 and therefore the clutch mechanism automatically returns to its ON state by the resilient force of the spring 19. Thus, under the flipping state, the clutch mechanism is shifted to its OFF state only while the push lever 18 continues to be manually depressed and a fishing line (not shown) can be freely taken out from a spool(not shown), whereas the fishing line is stopped immediately when the depressing force manually applied on the push lever 18 is removed.

Figure 6:
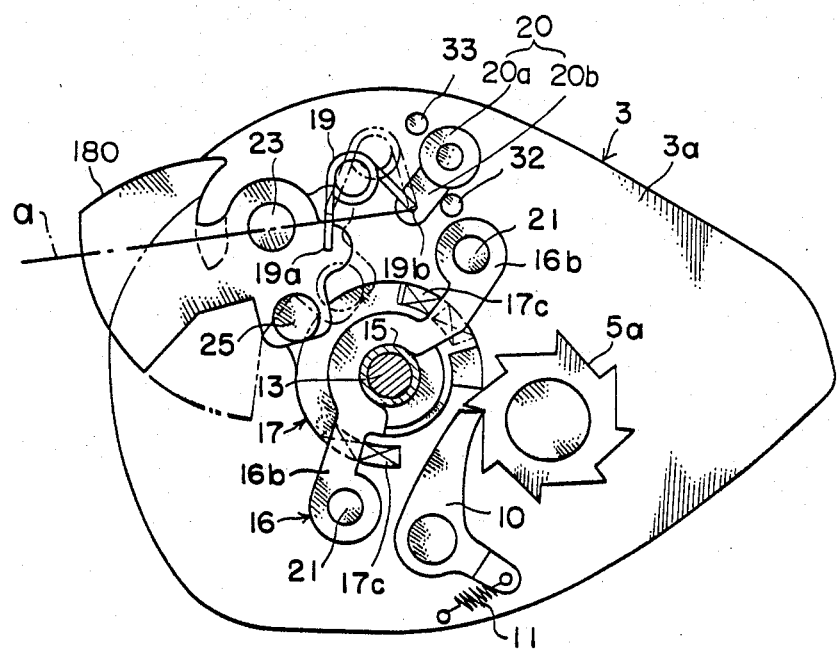
FIG. 6 is a front view showing a modified embodiment of this invention.

FIG. 6 shows modified embodiment of the invention. In this embodiment, a modified push lever 180 is adopted instead of the push lever 18, the operating lever 24 and the related parts 26, 27, 28 of the first embodiment. The operation thereof is, however, substantially same as the first embodiment. Similarly, the above flipping mechanism can be, of course, applied to any one of various kinds of clutch mechanisms such as disclosed in U.S. Pat. Nos. 4,014,442, 4,406,427 and so on, provided that the torsion spring is utilized to selectively urge the clutch mechanism in its ON and OFF states.

According to this invention, as above described, the clutch mechanism can be shifted between its normal and flipping conditions merely by one step, i.e., forwardly or rearwardly rotating the flipping lever. Further, the required members therefor are constructed so simple that fabrication and assembling therefor are very easy and the costs therefor become very low.

What is claimed is:

1. A fishing reel, comprising:
   a support;
   a spool shaft rotatably mounted on said support and connected to a spool on which fishing line is stored;
   a pinion coupled to handle for rotation thereby, said pinion being rotatably mounted on said support;
   mean for enabling movement of said pinion along its axial direction;
   means on said pinion and said spool shaft for locking one to the other to rotate jointly;
   clutch means for moving said pinion between a pinion ON position in which the locking means is engaged for locking said spool shaft to the pinion to drivingly couple the handle to the spool shaft, and a pinion OFF position in which the locking means is disengaged to free said spool shaft from said pinion to enable payout of the fishing line, said clutch means including a clutch cam rotatably mounted to said support;
   operating means for actuating said clutch means including a lever rotatably mounted at a point on said support and coupled to said clutch cam, said lever having a lever ON position corresponding to a clutch cam ON position in which said clutch means places the pinion in said pinion ON position, and said lever having a lever OFF position in which said clutch means places the pinion in said pinion OFF position;
   a flipping cam coupled for movement relative to said support, said movement involving only rotation, with such rotation being around an axis substantially perpendicular to said support, and stopping means for limiting a swing angle of said flipping cam between a first position and a second position;
   resilient means connected between said lever and said flipping cam such that rotation of said flipping cam causes movement of said resilient means between a flipping position when the flipping cam is in its first position, and a non-flipping position when said flipping cam is in its second position, said resilient means, in its non-flipping position, urging said lever to its lever ON position, when said lever is in said lever ON position, urging said lever to its lever OFF position when said lever is in the lever OFF position, and urging said flipping cam toward its said first position, said resilient means, in its flipping position, urging said lever to its lever ON position both when said lever is in the lever ON position and when said lever is in the lever OFF position, and urging said flipping cam toward its said second position;
   whereby when the flipping cam is in its first position, the lever remains in whichever one of the lever ON and lever OFF positions it is placed and the flipping cam is maintained by the resilient means in its first position, while with the flipping cam in its second position, the lever remains in its lever OFF position only while force is applied to rotate the lever from its lever ON to its lever OFF position against an urging force of the resilient means, and the flipping cam is maintained by the resilient means in its second position.

2. The clutch mechanism of claim 1, wherein the resilient means comprises a torsion spring having a first end connected to the lever and a second end connected to the flipping cam.

3. The clutch mechanism of claim 1, wherein the mounting point of said lever on said support and the second end of the torsion spring define a dead point line, whereby the first end of said torsion spring is on one side of said dead point line, the torsion spring urges the lever to the lever ON position and when the first end of said torsion spring is on the other side of said dead point line, the torsion spring urges the lever to the lever OFF position,
   wherein, with said flipping cam being in the first position, rotation of the lever between the lever ON and lever OFF positions causes movement of the first end of said torsion spring across the dead point line, and with said flipping cam being in its second position, rotation of the lever from the lever ON to the lever OFF position causes movement of the first end of said torsion spring only on said one side of the dead point line.

4. The clutch mechanism of claim 3, wherein said flipping cam is a shaft member provided with a protrusion rotatable around an axis of said shaft member, with said axis being substantially parallel to an axis of rotation of the lever, said second end to the torsion spring being connected to said protrusion, and further comprising means for manually rotating said flipping cam.

5. The clutch mechanism of claim 3, wherein said lever and said clutch cam are rotatably coupled to each other at a first connection point near an outer periphery, thereof, respectively.

6. The clutch mechanism of claim 5, wherein said torsion spring is connected to said lever adjacent said first connection point.

7. The clutch mechanism of claim 6, wherein said first connection point is located between the mounting point of the lever on said support and the second end of said torsion spring.

8. The clutch mechanism of claim 2, wherein said flipping cam is a shaft member provided with a protrusion rotatable around an axis of said shaft member, with said axis being substantially parallel to an axis of rotation of the lever, said second end of the torsion spring being connected to said protrusion, and further comprising means for manually rotating said flipping cam.

9. The clutch mechanism of claim 2, wherein said lever and said clutch cam are rotatably coupled to each other at a first connection point near an outer periphery, thereof respectively.

10. The clutch mechanism of claim 9, wherein said torsion spring is connected to said lever adjacent said first connection point.

11. The clutch mechanism of claim 10, wherein said firsts connection point is located between the mounting point of the lever on said support and the second end of said torsion spring.

* * * * *